United States Patent [19]

Chigira

[11] Patent Number: 5,625,198

[45] Date of Patent: Apr. 29, 1997

[54] TWO-DIMENSIONAL POSITIONING APPARATUS WITH OPTICAL SENSORS ALIGNED TO AVOID INTERFERENCE

[75] Inventor: Noboru Chigira, Saitama-ken, Japan

[73] Assignee: Sanyo Electric Co., Ltd., Osaku-fu, Japan

[21] Appl. No.: 598,403

[22] Filed: Feb. 8, 1996

Related U.S. Application Data

[63] Continuation of Ser. No. 257,338, Jun. 9, 1994, abandoned.

[30] Foreign Application Priority Data

Jun. 11, 1993 [JP] Japan .................................. 5-166170

[51] Int. Cl.$^6$ ............................................... G01N 21/86
[52] U.S. Cl. ..................... 250/559.29; 250/559.33; 269/73; 901/47
[58] Field of Search ........................... 901/47, 6; 414/749; 250/561, 223 R, 559.29, 559.33; 269/329, 73

[56] References Cited

U.S. PATENT DOCUMENTS

| | | | |
|---|---|---|---|
| 3,037,420 | 6/1962 | Stade | 88/14 |
| 4,523,100 | 6/1985 | Payne | 250/559.33 |
| 4,602,163 | 7/1986 | Pryor | 250/559.33 |
| 5,063,334 | 11/1991 | Tanita et al. | 318/568.1 |
| 5,279,178 | 1/1994 | Yanagisawa | 74/479 PH |

Primary Examiner—Stephone Allen
Attorney, Agent, or Firm—Darby & Darby

[57] ABSTRACT

A positioning apparatus performs positioning of a second movable member relative to a first stationary member in respect of two (X and Y) directions perpendicular to each other. A first optical sensor detects a predetermined position of the second member relative to the first member in respect of the X direction. The first optical sensor has a light projector and a light receiver separately arranged on the first and second members such that they are opposed to each other in the Y direction, when the second member is in the predetermined position in respect of the X direction. A second optical sensor detects a predetermined position of the second member relative to the first member in respect of the Y direction. The second optical sensor has a light projector and a light receiver separately arranged on the first and second members such that they are opposed to each other in the X direction, when the second member is in the predetermined position in respect of the Y direction. An X-direction moving mechanism moves the second member in the X direction. A Y-direction moving mechanism moves the second member in the Y direction. A controller stops a moving operation of the X-direction moving mechanism based on a detection signal from the first optical sensor, and stops a moving operation of the Y-direction moving mechanism based on a detection signal from the second optical sensor.

4 Claims, 3 Drawing Sheets

TWO-DIMENSIONAL POSITIONING APPARATUS WITH OPTICAL SENSORS ALIGNED TO AVOID INTERFERENCE

This is a continuation of application Ser. No. 08/257,338, filed Jun. 9, 1994, now abandoned.

BACKGROUND OF THE INVENTION

1. Field of the Invention

This invention relates to a positioning apparatus for use e.g. in a vending machine, which uses an optical sensor as position detecting means.

2. Prior Art

An optical sensor as position detecting means is generally formed by a light projector comprised of a light-emitting element and a light receiver comprised of a light-receiving element. The light projector and the light receiver are arranged in an opposed manner, whereby when an object intercepts a light path formed between them, a predetermined position of the object is detected. More specifically, in a case where the object for intercepting the light path is movable, and an apparatus on which the light projector and the light receiver are mounted is stationary or fixed, the movement of the object is stopped when the predetermined position of the object is detected, thus performing the positioning of the object relative to the apparatus. Conversely, when the object is stationary or fixed, and the apparatus is movable, the movement of the apparatus is stopped when a predetermined position of the apparatus is detected in a similar manner, thereby effecting positioning of the apparatus relative to the object.

As the optical sensor used in such a position-detecting device, a photointerrupter or the like is generally used, for instance. The photointerrupter is constructed as a package comprising a light-emitting element and a light-receiving element which are opposed to each other with space provided therebetween, and an electronic circuit associated with these optical elements. The photointerrupter is arranged on a fixed or stationary member, while a light-intercepting plate is provided on a movable member such that the light-intercepting plate is inserted into the space between the optical elements of the photointerrupter when the movable member is moved to a predetermined location where it should be positioned. The photointerrupter and the light-intercepting plate form the position-detecting device. In operation, the movable member moves near the fixed member until the light-intercepting plate is inserted into the space of the photointerrupter arranged on the fixed member to interrupt or cut off the light path, whereupon the electronic circuit delivers a detection signal to a drive system for driving the movable member. The detection signal causes the movable member to stop at the predetermined location where it should be positioned, thus completing positioning of the movable member relative to the fixed or stationary member.

In the case of a cup vending machine in which a cup is transferred between a body thereof including a block for preparing a drink as a vend product and a main door of same having a vend product outlet formed therein for presenting the cup containing the prepared drink to a purchaser, it is necessarily required to perform positioning of a device on the body side for delivering the cup and a device on the main door side for receiving the cup. This positioning is necessitated, because registering of the body and the main door is rather unstable due to a possible distortion of the body (cabinet) caused by the state of installation of the vending machine (when the vending machine is not placed in an exactly level position), wear of hinges of the main door, and a possible distortion of the main door itself. The positioning of the device for delivering the cup and the device for receiving the cup need be effected, though depending on the configurations of these devices, in respect of at least two of the three directions along an X-axis, a Y-axis, and a Z-axis, which are perpendicular to each other, and at the same time, it is preferred that position-detecting sensors (including switches) are of a non-contact type.

However, to effect such positioning in respect of two directions or dimensions, it is required to arrange two sets of conventional photointerrupters on one of the two devices for delivering a cup and for receiving the cup, in two respective directions perpendicular to each other such that they can determine respective positions related to the two directions perpendicular to each other, and to mount two light-intercepting plates in a manner crosswise to each other. According to this construction of an apparatus intended for positioning in respect of two directions or dimensions, however, when one of the light-intercepting plates is inserted into space in one of the two photointerrupters to effect positioning in respect of one direction or dimension, and thereafter positioning in respect of the other direction is started, the light-intercepting plate hits against the light-receiving element or light-emitting element associated therewith. This problem can be avoided, theoretically, by arranging the two optical elements of each photointerrupter such that they are opposed to each other across space for travel of a movable body (device) carrying the light-intercepting plates. In practice, however, this arrangement of the positioning apparatus gives rise to problems of scattering of light emitted from each light-emitting element and erroneous detection due to such scattering of light, so that it is required to use high-accuracy sensors in the apparatus, which makes such arrangement unsuitable for vending machines from the viewpoint of manufacturing costs, etc. In short, although the above-mentioned type of optical sensors are effective in determining a position in one direction, they are not suitable for effecting a two-dimensional positioning, i.e. putting a movable member into a predetermined position defined by parameters in two directions perpendicular to each other.

SUMMARY OF THE INVENTION

It is the object of the invention to provide a positioning apparatus which is capable of positioning in respect of two directions or dimensions, without requiring the use of high-accuracy sensors.

To attain the above object, the invention provides a positioning apparatus adapted to perform positioning of a second member, which is movable, relative to a first member, which is stationary, in respect of two directions consisting of an X direction and a Y direction perpendicular to each other.

The positioning apparatus according to the invention is characterized by comprising:

a first optical sensor for detecting a predetermined position of the second member relative to the first member in respect of the X direction to deliver a detection signal, the first optical sensor having a light projector and a light receiver separately arranged on the first member and the second member such that the light projector of the first optical sensor and the light receiver of the first optical sensor are opposed to each other in the Y direction, when the second member is in the predetermined position in respect of the X direction;

a second optical sensor for detecting a predetermined position of the second member relative to the first member in respect of the Y direction to deliver a detection signal, the second optical sensor having a light projector and a light receiver separately arranged on the first member and the second member such that the light projector of the second optical sensor and the light receiver of the second optical sensor are opposed to each other in the X direction, when the second member is in the predetermined position in respect of the Y direction;

X-direction moving means for moving the second member in the X direction;

Y-direction moving means for moving the second member in the Y direction; and control means for stopping the moving operation of the X-direction moving means based on the detection signal from the first optical sensor, and for stopping the moving operation of the Y-direction moving means based on the detection signal from the second optical sensor.

According to the positioning apparatus of the present invention, as the X-direction moving means and Y-direction means operate to cause the second member, which is movable, to approach the first member, which is stationary or fixed, one of the first and second optical sensors, e.g. the first optical sensor which is formed by the light projector and the light receiver thereof arranged to face in an opposed manner in respect of the Y direction detects the predetermined position of the second member relative to the first member in respect of the X direction to generate the detection signal. In response to the detection signal, the control means causes the X-direction moving means to stop, thereby completing positioning of the second member relative to the first member in respect of the X direction. Similarly, the second optical sensor which is formed by the light projector and the light receiver thereof arranged to face in an opposed manner in respect of the X direction detects the predetermined direction of the second member relative to the first member in respect of the Y direction to generate the detection signal. In response to the detection signal, the control means causes the Y-direction moving means to stop, thereby completing positioning of the second member relative to the first member in respect of the Y direction.

The light projectors and the light receivers of the first and second optical sensors are separately arranged on the first member and the second member, which makes it possible to effect positioning of the second member without causing problems of interference between the light projector and light receiver of the first optical sensor for X-direction positioning and the light projector and light receiver of the second sensor for the Y-direction positioning.

Preferably, the light projector of the first optical sensor and the light projector of the second optical sensor are arranged on the second member which is movable, and the light receiver of the first optical sensor is arranged on the first member at a location corresponding to the predetermined position in respect of the X direction, while the light receiver of the second optical sensor is arranged on the first member at a location corresponding to the predetermined position in respect of the Y direction.

According to the construction of this preferred embodiment, the light projectors of the optical sensors emit light outwardly in respective directions perpendicular to the directions of movement of the second member. Therefore, even if the two optical sensors are arranged on the same plane, there arises no problem of an erroneous detection of light emitted in the X direction from the second optical sensor by the first optical sensor for detecting light emitted in the Y direction, and vice versa.

More preferably, the light projector of the first optical sensor and the light projector of the second optical sensor are each comprised of a light-emitting element and a covering formed with a slit, which covers the light-emitting element, and wherein the light projectors are each set such that a longitudinal axis of the slit is perpendicular to a plane defined by the X direction and the Y direction.

According to this construction, it is possible to enhance the accuracy of detecting the position in respect of the X direction and that in respect of the Y direction, while absorbing a certain degree of deviation of the second member in a direction perpendicular to the X-Y plane.

The above and other objects, features, and advantages of the invention will become more apparent from the following detailed description taken in conjunction with the accompanying drawings.

DETAILED DESCRIPTIONS

Figure 1:
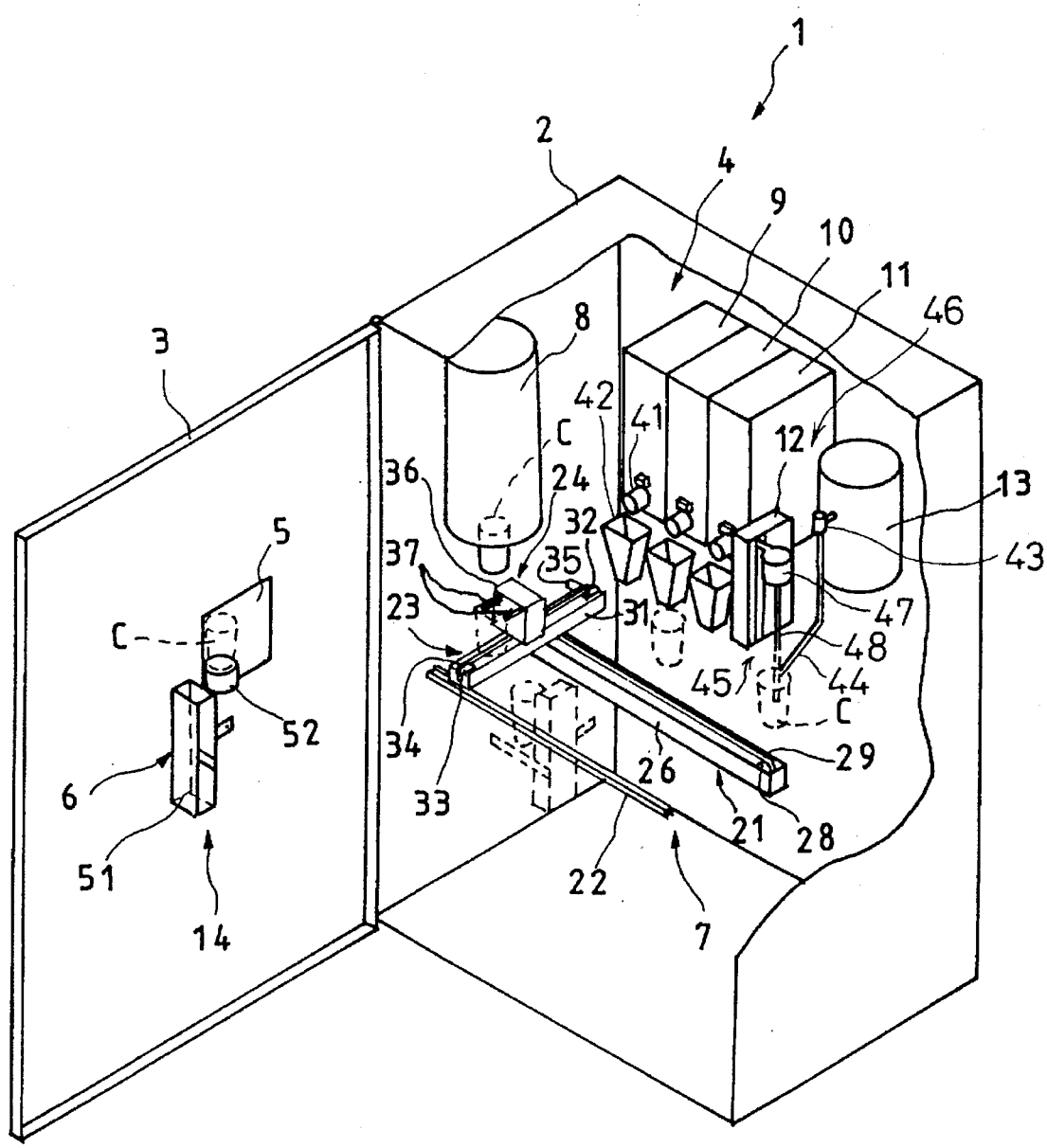
FIG. 1 is a perspective view, partially cut away, of a vending machine in which is used a positioning apparatus according to an embodiment of the invention.

Next, there will be described a positioning apparatus of the invention with reference to drawings showing an embodiment thereof which is used in a cup vending machine. This cup vending machine is distinguished from a conventional type adapted to prepare a drink by mixing materials and water or hot water at a vend product outlet, in that a cup for holding a drink prepared within a body or main block of the vending machine is delivered to a main door block of same, and then lifted up to a vend product outlet. FIG. 1 is a perspective view of a vending machine 1 including a block for preparing hot instant coffee. As shown in the figure, the vending machine 1 comprises a body 2 and a main door 3 for closing and opening a front opening of the body 2. The body 2 has a vend product-preparing system 4 incorporated therein for preparing a vend product (cup C) and for delivering the vend product to the main door 3 side. The main door 3 is equipped with a cup lifter 6 for lifting the vend product received from the vend product-preparing system 4 to a vend product outlet 5.

The vend product-preparing system 4 is comprised of a cup conveyor 7 which is capable of conveying the cup C in longitudinal directions (i.e. in an X direction) and in crosswise directions toward and away from the main door 3 (i.e. in a Y direction perpendicular to the X direction) as desired, a cup dispenser 8 for feeding cups, a cream canister 9 for holding cream, an instant coffee canister 10 for holding instant coffee, a sugar canister for holding sugar 11, a stirring device 12 for stirring materials in the cup C, and a hot water tank 13 for holding hot water, the cup dispenser 8, the canisters 9 to 11, the stirring device 12, and the hot water tank 13 being arranged in order in a longitudinal direction (i.e. in the X direction). The cup lifter 6 is mounted on the inner wall of the main door at a location adjacent to the vend product outlet 5.

The cup conveyor 7 is comprised of a longitudinally conveying mechanism (X-direction moving means) 21 for conveying the cup C in longitudinal directions, a guide rail 22 arranged in front of the longitudinally conveying mechanism 21 to extend in parallel therewith, a crosswise conveying mechanism (Y-direction moving means) 23 for conveying the cup C in crosswise directions toward and away from the main door 5, a cup holding mechanism 24 installed on the crosswise conveying mechanism 23 for holding the cup C, and a controller (control means) 25 for controlling the operations of the longitudinally conveying mechanism 21, the crosswise conveying mechanism 23, and the cup holding mechanism 24. The cup C is properly held by the cup holding mechanism 24, and conveyed by the crosswise conveying mechanism 23 in the crosswise directions, as well as by the longitudinal conveying mechanism 21 in the longitudinal directions while being guided along the guide rail 22, as desired.

Figure 2:
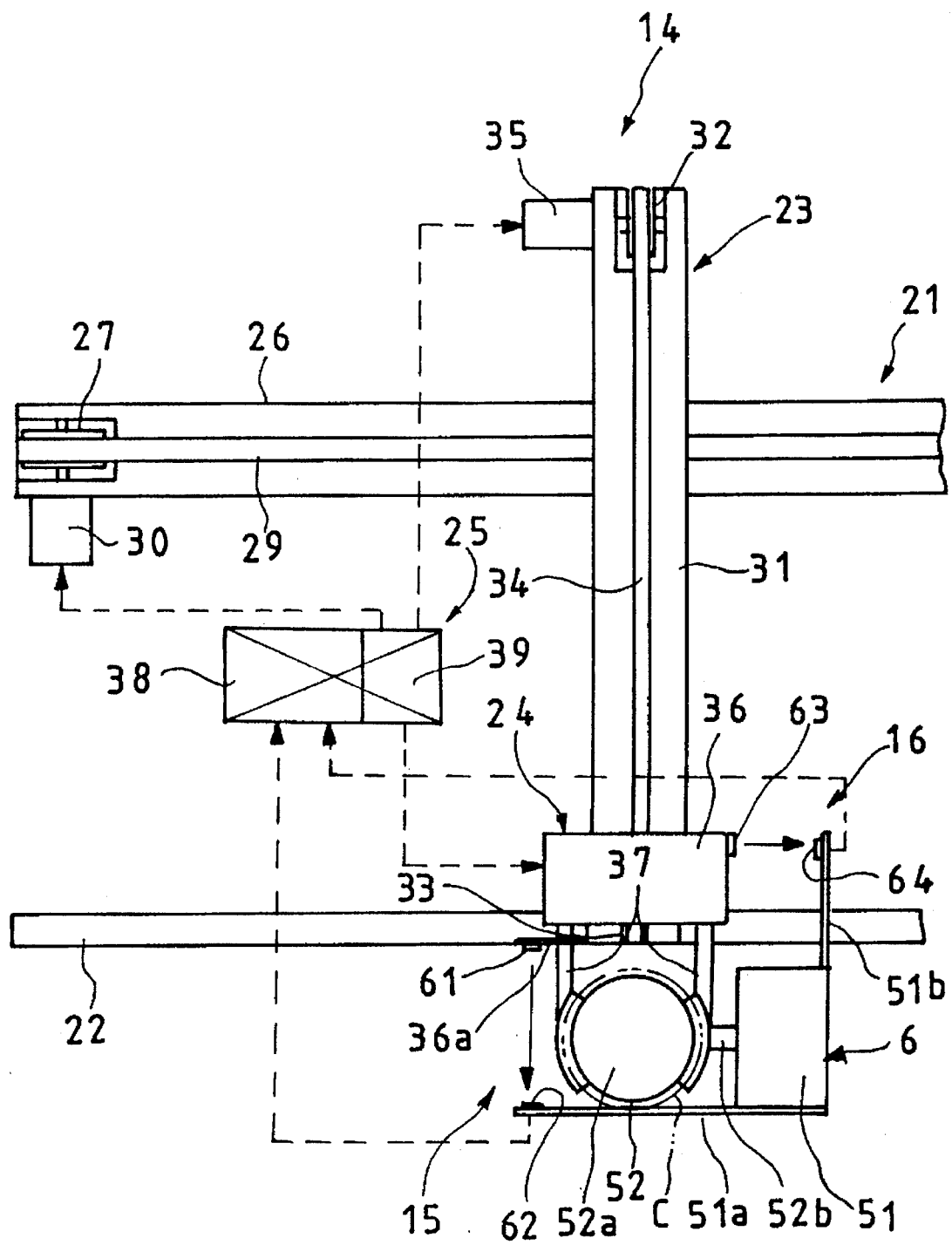
FIG. 2 is a plan view showing the positioning apparatus according to the embodiment.

The longitudinally conveying mechanism 21 is comprised of a support frame 26 extending straight in a longitudinal direction, a drive pulley 27, see FIG. 2, and a trailing pulley 28 rotatively mounted on respective shafts, not shown, arranged on opposite ends of the support frame 26, an endless conveyor belt 29 stretched on the two pulleys 27 and 28, and a conveyor motor (pulse motor) 30 for rotating the drive pulley 27, which is equipped with an encoder, not shown. The crosswise conveying mechanism 23 is secured to a predetermined portion of the conveyor belt 29. As the conveyor belt 29 travels or moves, the crosswise conveying mechanism 23 and the cup holding mechanism 24 installed thereon are moved in a longitudinal direction while being guided by upper surfaces of the support frame 26 and the guide rail 22.

Similarly, the crosswise conveying mechanism 23 is comprised of a support frame 31 extending straight in a crosswise direction, a drive pulley 32 and a trailing pulley 33 rotatively mounted on respective shafts, not shown, arranged on opposite ends of the support frame 31, an endless conveyor belt 34 stretched on the two pulleys 32 and 33, and a conveyor motor (pulse motor) 35 for rotating the drive pulley 32, which is equipped with an encoder, not shown. The cup holding mechanism 24 is secured to a predetermined portion of the conveyor belt 34. As the conveyor belt 34 travels or moves, the cup holding mechanism 24 is moved in a crosswise direction while being guided by the upper surface of the support frame 31.

The cup holding mechanism 24 is comprised of a body casing 36 and a pair of holding arms 37 projected out from upper portions of a front wall of the body casing 36. The body casing 36 contains a motor for driving the holding arms 37, i.e for causing same to open and close, via a cam and a link mechanism, none of which are shown, between a cup holding position for holding the cup C and a cup releasing position for releasing the cup C. The cup C is held between the two holding arms 37, 37 with its brim being hooked thereon.

The controller 25 is comprised of a microcomputer 38 and a motor driver 39 associated therewith, as shown in FIG. 2. The microcomputer 38 controls the operations of the longitudinally conveying mechanism 21, the crosswise conveying mechanism 23, and the cup holding mechanism 24, via the motor driver 39. More specifically, the controller 25 controls the operations of these mechanism such that the cup C received in a home position is conveyed on the cup holding mechanism 24, in longitudinal and crosswise directions, as desired, to have a drink prepared therein, and then delivered to the cup lifter 6, followed by the cup holding mechanism returning to the home position.

The cup dispenser 8 holds a number of cups in stock and includes a cup delivering mechanism, not shown, arranged at the bottom thereof. A location immediately under the cup dispenser 8 serves as the home position of the cup conveyor 7, i.e. the cup holding mechanism 24. When a vending command is generated, the cup C is delivered one at a time from within the cup dispenser 8 via the delivering mechanism to fall into space formed between the holding arms 37, 37 of the cup holding mechanism 24.

The cream canister 9, the coffee canister 10, and the sugar canister 11 hold powder materials P of cream, instant coffee, and sugar, in stock, respectively, and sequentially supply predetermined amounts of the powder materials P into the cup C via feeding mechanisms 41 each projected from lower parts of the respective canisters. Under the feeding mechanisms 41, powder chutes 42 are provided, respectively, whereby each amount of the powder materials P is permitted to be supplied via a corresponding one of the powder chutes 42 into the cup C, which is conveyed by the cup conveyor 7 to one proper position to another under the powder chutes 42.

The hot water tank 13 has a heater, not shown, arranged therein, to prepare and supply hot water from a port formed through an upper portion of the tank 13, and includes a hot water valve (electromagnetic valve) 43 mounted on the port and a nozzle 44 extending from the hot water valve 43. The nozzle 44 extends forming curvature as far as its open end is positioned immediately above the cup C conveyed to a position exactly under the stirring device 12, permitting hot water to be poured into the cup C.

The stirring device 12 is comprised of a stirrer 45 for stirring powder materials and hot water to mix them within the cup C, and a lifting mechanism 46 for lifting and lowering the stirrer 45. The stirrer 45 has a stirring motor 47, a rotating shaft 48, and an impeller 49 secured to an end of the rotating shaft 48, and the whole arrangement of the stirrer 45 is lifted or lowered by a drive belt, not shown, of the lift mechanism 46. When the cup containing powder materials is conveyed to the position exactly under the stirrer 45, hot water is poured therein from the hot water tank 13, and the impeller 49 is inserted into the cup C to effect stirring (preparation of hot coffee).

The cup lifter 6 is arranged on an inner wall of the main door 3 so as not to become an obstacle in replenishing the powder materials and performing maintenance of the vend product-preparing system 4. When the main door 3 is closed, the cup lifter 6 faces the front side of the cup conveyor 7. The cup lifter 6 comprises a body 51 and a cup tray 52 projected out of the body 51. The cup tray 52 has a coaster 52a on which the cup is placed, and an arm 52b supporting the coaster 52a (see FIG. 2). The arm 52b of the cup tray 52 is secured to a belt, not shown, arranged within the body 51. As the belt is driven by a lift motor, not shown, for rotation in a vertical direction, i.e. for moving up and down, the cup tray 52 is lifted and lowered.

Now, there will be described an outline of a cup-delivering operation of the vending machine. When a vending command is received, the cup C is dropped from the cup dispenser 8 into the cup holding mechanism 24 in the home position. The cup C held by the cup holding mechanism 24 is conveyed by step feed to a right back position immediately under the powder chute 42 of the cream canister 9 by the longitudinally conveying mechanism 21 and the crosswise conveying mechanism 23. The cup C is supplied with cream from the cream canister 9, and then sequentially conveyed by step feed in a longitudinal direction, while being supplied with instant coffee from the coffee canister 10, and sugar from the sugar canister 11, finally to the position under the stirring device 12, where hot water is supplied from the hot water tank 13 into the cup C. Then, the stirring device 12 starts to operate to stir the powder materials and hot water, thereby preparing a vend product or hot coffee.

Then, the cup C filled with the prepared drink and held by the cup holding mechanism 24 is further conveyed toward the cup lifter 6 located in a diagonally forward to the left of the present position as viewed from FIG. 1. When the cup C is conveyed to a predetermined position in the vicinity of the cup lifter 6 to stop there, the cup lifter 6 operates to cause the cup tray 52 to receive the cup C by holding up the cup C from below, which is held by the cup holding mechanism 24. When the cup lifter 6 thus completely receives the cup C, it once stops there to be in standby. At this time, the arms 37 of the cup holding mechanism 24 are opened to their cup releasing position, and at the same time the crosswise conveying mechanism 23 operates to move the cup holding mechanism 24 backward. Then, the longitudinally conveying mechanism 21 operates to move the cup holding mechanism 24 to its home position. On the other hand, when the cup holding mechanism 24 recedes, the cup lifter 6 lifts the cup C to a predetermined position to present the cup C at the vend product outlet 5 from below. When the cup C is taken out from the vend product outlet 5 by a purchaser, the cup tray 52 is lowered to its original position (home position). Whenever the vending operation is performed, the cup holding mechanism 24 on the body 2 side and the cup lifter 6 on the main door 3 side are automatically positioned by a positioning apparatus 14 to thereby enable the cup C to be smoothly delivered from the body 2 side to the main door 3 side.

Next, the positioning apparatus 14 will be described with reference to FIG. 2. The positioning apparatus 14 is comprised of the cup lifter 6 as a first member, which is fixed or stationary in its home position, and the cup holding mechanism 24, which is movable, the longitudinally conveying mechanism 21 for moving the cup holding mechanism 24 in longitudinal directions, the crosswise conveying mechanism 23 for moving the cup holding mechanism 24 in crosswise directions, two sets of optical sensors (first optical sensor 15 and second optical sensor 16) arranged on the cup lifter 6 and the cup holding mechanism 24, and the controller 25 for stopping operations of the longitudinally conveying mechanism 21 and the crosswise conveying mechanism 23 based on detection signals delivered from the optical sensors 15 and 16.

The first optical sensor 15 is comprised of a first light-emitting element 61 formed e.g. by a light emitting diode and a first light-receiving element 62 formed e.g by a phototransistor. The first light-emitting element 61 is arranged on a first mounting plate 36a secured to a front wall of the body casing 36 of the cup holding mechanism 24 in a manner facing forward, while the first light-receiving element 62 is arranged on a second mounting plate 51a secured to the body 51 of the cup lifter 6 in a manner facing backward. Similarly, the second optical sensor 16 is comprised of a second light-emitting element 63 and a second light-receiving element 64. The second light-emitting element 63 is mounted on a side wall of the body casing 36 of the cup holding mechanism 24 in a manner facing rightward as viewed from FIG. 2, while the second light-receiving element 64 is mounted on a third mounting plate 51b secured to the side of the body 51 of the cup lifter 6.

In other words, the first optical sensor 15 detects a predetermined longitudinal position of the cup holding mechanism 24 relative to the cup lifter 6 when the first light-emitting element 61 and the first light-receiving element 62 are crosswise opposed to each other, while the second optical sensor 16 detects a predetermined crosswise position of the cup holding mechanism 24 relative to the cup lifter 6 when the second light-emitting element 63 and the second light-receiving element 64 are longitudinally opposed to each other. That is, the cup holding mechanism 24 moves near the cup lifter 6 until light emitted from the first light-emitting element 61 is input to the first light-receiving element 62, i.e. until the predetermined longitudinal position of the cup holding mechanism relative to the cup lifter 6 is detected, whereupon the detection signal is delivered from the first optical sensor 15 to the controller 25 which operates, in response to the detection signal, to stop the longitudinal movement of the cup holding mechanism 24. On the other hand, when light emitted from the second light emitting element 63 is input to the second light-receiving element 64, the predetermined crosswise position of the cup holding mechanism 24 relative to the cup lifter 6 is detected, whereupon the detection signal is delivered from the second optical sensor 16 to the controller 25, which operates, in response to the detection signal, to stop the crosswise movement of the cup holding mechanism 24.

Figure 3:
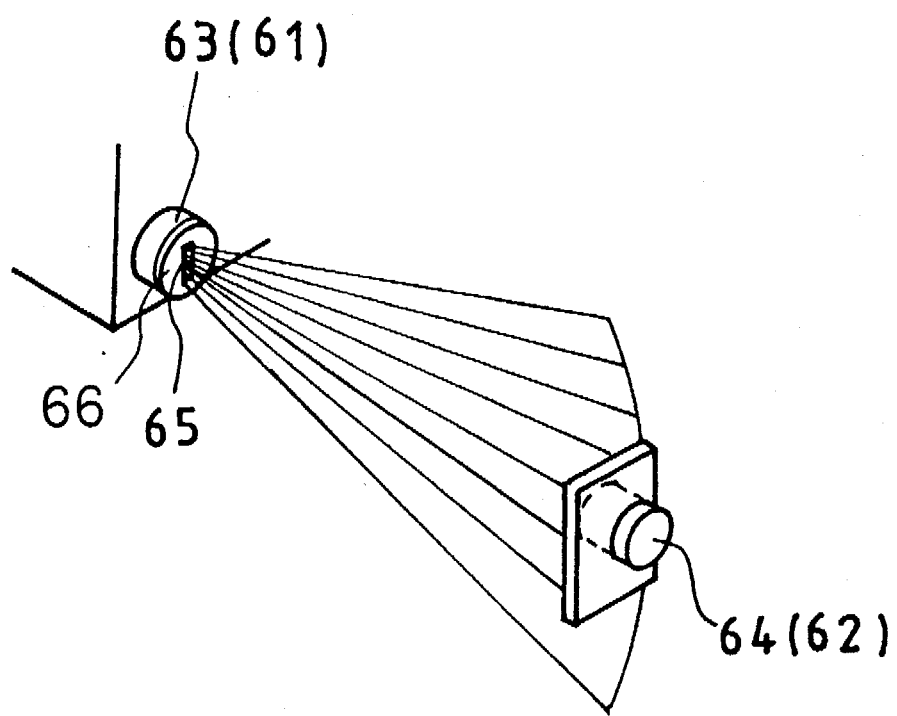
FIG. 3 is a perspective view showing an optical sensor in its light-emitting and light-receiving status.

The light-emitting elements 61 and 63 are each comprised of a body thereof and a covering 66 covering a light emitting surface of the body, which covering is formed with a slit 65 (FIG. 3). The elements 61 and 63 are each set such that a longitudinal axis of the slit 65 is perpendicular to a level plane to allow light (diverging light) therefrom to be emitted as a narrow ray in a horizontal direction (Z-axis). This makes it possible to enhance the accuracy of positioning the cup holding mechanism 24 as it moves in one direction, while absorbing a certain degree of deviation of the cup holding mechanism 24 from a proper level.

The cup holding mechanism 24 holding the cup C is conveyed away from the position exactly under the stirring device 12, first in a leftward direction as viewed from FIG. 1, and then in a forward direction, thereby approaching the cup lifter 6. During this process, when the first light-emitting element 61 and the first light-receiving element 62 are crosswise opposed to each other, the controller 25 responsive to the detection signal from the first optical sensor 15 operates to stop the longitudinally conveying mechanism 21, thereby completing longitudinal positioning of the cup holding mechanism 24. Then, when the second light-emitting element 63 and the second light-receiving element 64 are longitudinally opposed to each other, the controller 25 responsive to the detection signal from the second optical sensor 16 operates to stop the crosswise conveying mechanism 23, thereby completing crosswise positioning of the cup holding mechanism 24. In this connection, an auxiliary sensor or an auxiliary switch may be provided at a location, e.g. 20 mm to 30 mm before each of the positions where the longitudinal and crosswise positionings are completed, to thereby cause the speed of movement of the cup holding mechanism 24 to be reduced from these positions. Alternatively, since the longitudinally conveying mechanism 21 and the crosswise conveying mechanism 23 are each equipped with the encoder, deceleration of the movement of the cup holding mechanism 24 may be performed after each conveying mechanism is driven by a predetermined number of steps.

FIG. 3 shows an arrangement for the light projector 63 or 61 and the light receiver 64 or 62 of the optical sensors. In this arrangement, the optical projector 63 or 61 has positioned in front of it a light shield 66, having a slit 65 extending in the Z direction. Accordingly, the light from the projector is confined to the Z plane. Such an arrangement permits a certain degree of deviation of the movable second member relative to the stationary first member in the Z direction while still assuring proper response between the light projector and light receiver of a respective sensor.

As described heretofore, according to the present embodiment, the first light-emitting element 61 and the first light-receiving element 62 of the first optical element 15 are separately arranged on the cup holding mechanism 24 and the cup lifter 6, respectively, to face in crosswise opposite directions, and the second light-emitting element 63 and the second light-receiving element 64 of the second optical sensor 16 are separately arranged on the cup holding mechanism 24 and the cup lifter 6, respectively, to face in longitudinally opposite directions. Therefore, whenever a cup vending operation of the cup vending machine is performed, it is possible to effect automatic longitudinal and crosswise positionings of the cup holding mechanism 24 relative to the cup lifter 6 without suffering from a problem of interference between the optical sensors 15 and 16, etc., while dispensing with light emitting and receiving means having a high accuracy. Therefore, it is possible to effect smooth delivery of the cup C from the body 2 side of the vending machine 1 to the main door 3 side of same without requiring an expert to regularly adjust positions of the mechanisms, devices, etc. on each vending machine 1 installed on numerous locations.

Although, in the above embodiment, description is made on a case where the positioning apparatus of the present invention is used in a vending machine, this is not limitative, but it goes without saying that the present positioning apparatus may be applied to any use which does not demand very high accuracy.

What is claimed is:

1. A positioning apparatus adapted to perform positioning of a movable second member relative to a stationary first member only in respect of an X direction and a Y direction perpendicular to each other comprising:

X-direction moving means for moving said second member only in said X direction;

Y-direction moving means for moving said second member only in said Y direction;

a first optical sensor for detecting a predetermined position of said movable second member relative to said stationary first member in said X direction and delivering a first detection signal in response thereto, said first optical sensor having one of a light projector and a light receiver separately arranged on said first member and the other of said light projector and light receiver arranged on said second member such that said light projector and said light receiver of said first optical sensor are opposed to each other in said Y direction when said second member is in said predetermined position in respect of said X direction;

a second optical sensor for detecting a predetermined position of said movable second member relative to said stationary first member in said Y direction and delivering a second detection signal in response thereto, said second optical sensor having one of a light projector and a light receiver separately arranged on said first member and the other of said light projector and light receiver arranged on said second member such that said light projector and said light receiver of said second optical sensor are opposed to each other in said X direction, when said second member is in said predetermined position in respect of said Y direction; and control means receiving said first and second detection signals from said first and second optical sensors for stopping a moving operation of said X-direction moving means upon receiving said first detection signal from said first optical sensor upon said second member reaching said predetermined position in the X-direction and for stopping a moving operation of said Y-direction moving means upon receiving said second detection signal from said second optical sensor upon said second movable member reaching said predetermined position in said Y-direction.

2. A positioning apparatus according to claim 1, wherein one of said light projector and said light receiver of said first optical sensor and one of said light projector and said light receiver of said second optical sensor are arranged on said movable second member, and the other of said light projector and light receiver of said first optical sensor is arranged on said first member at a location corresponding to said predetermined position in said X direction, and the other of said light projector and said light receiver of said second optical sensor is arranged on said first member at a location corresponding to said predetermined position in said Y direction.

3. A positioning apparatus according to claim 1, wherein said light projector of said first optical sensor and said light projector of said second optical sensor each comprise a light-emitting element and a covering formed with a slit which covers said light-emitting element, and said light projectors are each set such that a longitudinal axis of said slit is perpendicular to a plane defined by said X direction and said Y direction.

4. A positioning apparatus according to claim 2, wherein said light projector of said first optical sensor and said light projector of said second optical sensor are each comprised of a light-emitting element and a covering formed with a slit which covers said light-emitting element, and said light projectors are each set such that a longitudinal axis of said slit is perpendicular to a plane defined by said X direction and said Y direction.

* * * * *